US012706500B2

(12) United States Patent
Suto et al.

(10) Patent No.: US 12,706,500 B2
(45) Date of Patent: Aug. 11, 2026

(54) WINDING FOR ELECTROMAGNETIC COMPONENT, STATOR FOR ROTARY ELECTRIC MACHINE, ROTARY ELECTRIC MACHINE, AND WHEEL

(71) Applicant: HITACHI, LTD., Tokyo (JP)

(72) Inventors: Tetsuya Suto, Tokyo (JP); Akeshi Takahashi, Tokyo (JP); Makoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 792 days.

(21) Appl. No.: 17/927,374

(22) PCT Filed: May 13, 2021

(86) PCT No.: PCT/JP2021/018275
§ 371 (c)(1),
(2) Date: Nov. 23, 2022

(87) PCT Pub. No.: WO2022/024498
PCT Pub. Date: Feb. 3, 2022

(65) Prior Publication Data

US 2023/0223808 A1 Jul. 13, 2023

(30) Foreign Application Priority Data

Jul. 28, 2020 (JP) ................................ 2020-127745

(51) Int. Cl.
*H02K 3/04* (2006.01)
*H02K 15/085* (2006.01)

(52) U.S. Cl.
CPC ............ *H02K 3/04* (2013.01); *H02K 15/085* (2013.01)

(58) Field of Classification Search
CPC ............................ H02K 3/16; H02K 3/04–12
(Continued)

(56) References Cited

U.S. PATENT DOCUMENTS 6,208,058 B1 3/2001 Taji et al.
7,268,456 B2 * 9/2007 Harada .................... H02K 3/12 310/201

(Continued)

FOREIGN PATENT DOCUMENTS

JP 2001-37131 A 2/2001
JP 2019-140732 A 8/2019
WO 2019/059295 A1 3/2019

OTHER PUBLICATIONS

International Search Report of PCT/JP2021/018275 dated June dated Jun. 22, 2021.

(Continued)

*Primary Examiner* — Alexander Talpalatski
(74) *Attorney, Agent, or Firm* — MATTINGLY & MALUR, PC

(57) ABSTRACT

The present invention addresses the problem of providing a winding for an electromagnetic component, a stator for a rotary electric machine, a rotary electric machine, and a wheel, which can simplify an assembly step while improving joint quality of a coil end. This winding for electromagnetic components comprises a first conductor (3) and a second conductor (4) electrically connected to the first conductor (3). The first conductor (3) and the second conductor (4) are fixed inside an electromagnetic component. At least one among the first conductor (3) and the second conductor (4) has a bent section (10). The first conductor (3) is pressed against and makes close contact with the second conductor (4) by a restoring force (12) due to residual stress of the bent section (10).

11 Claims, 14 Drawing Sheets

(58) Field of Classification Search
USPC .......................................................... 310/208
See application file for complete search history.

(56) References Cited

U.S. PATENT DOCUMENTS

| | | | | |
|---|---|---|---|---|
| 7,800,273 | B2 * | 9/2010 | Shichijoh ................. | H02K 3/50 310/71 |
| 8,164,229 | B2 * | 4/2012 | Yamamoto ............... | H02K 3/12 310/179 |
| 8,269,387 | B2 * | 9/2012 | Endo ...................... | H02K 3/522 310/194 |
| 2004/0046475 | A1 * | 3/2004 | Holzheu .................. | H02K 3/28 310/201 |
| 2019/0245417 | A1 | 8/2019 | Okuda et al. | |
| 2020/0366146 | A1 | 11/2020 | Koga et al. | |
| 2021/0135531 | A1 * | 5/2021 | Iga ........................... | H02K 3/28 |

OTHER PUBLICATIONS

International Preliminary Report on Patentability received in corresponding International Application No. PCT/JP2021/018275 dated Feb. 9, 2023.

* cited by examiner

WELDING PENETRATION

4: SECOND COIL

3: FIRST COIL

PUNCHING MOLDING OF PLATE MATERIAL

BENDING OF RECTANGULAR MAGNET WIRE

PATTERN IN WHICH INTERMEDIATE PORTION IS OBLIQUE
17
14
16
1
4
3
2
15

WINDING FOR ELECTROMAGNETIC COMPONENT, STATOR FOR ROTARY ELECTRIC MACHINE, ROTARY ELECTRIC MACHINE, AND WHEEL

TECHNICAL FIELD

The present invention relates to a winding for an electromagnetic component, a stator for a rotary electric machine, a rotary electric machine, and a wheel.

BACKGROUND ART

Since high torque is required in a drive motor of xEV (electric vehicle: electric car, plug-in hybrid vehicle, hybrid vehicle, hydrogen fuel cell car, and the like), it is necessary to apply large current to a motor winding. At that time, in order to reduce copper loss, a square wire capable of improving a space factor in a slot and suppressing conductor resistance is used.

In a coil end forming process, a segment coil is inserted into a stator slot and welded or soldered. However, welding failure due to insufficient pressing between coils is a concern in welding, and bonding failure due to deformation of a coil bent portion by residual stress due to heat during melting is a concern in dissimilar metal joining such as soldering. For this reason, coils are pressed by caulking (see, for example, PTL 1), a jig, or the like.

CITATION LIST

Patent Literature

PTL 1: JP 2001-037131 A

SUMMARY OF INVENTION

Technical Problem

In the technique disclosed in PTL 1, it is possible to improve joint quality of a coil end. However, since the number of components and the number of work steps increase, there has been a problem that an assembly process cannot be simplified.

An object of the present invention is to provide a winding for an electromagnetic component, a stator for a rotary electric machine, a rotary electric machine, and a wheel that can simplify an assembly process while improving a joint quality of a coil end.

Solution to Problem

In order to achieve the above object, the present invention includes a first conductor, and a second conductor electrically connected to the first conductor. The first conductor and the second conductor are fixed in an electromagnetic component, at least one of the first conductor and the second conductor has a bent portion, and the first conductor is brought into pressure-contact with the second conductor by a restoring force due to a residual stress of the bent portion.

Advantageous Effects of Invention

According to the present invention, it is possible to simplify an assembly process while improving joint quality of a coil end. An object, a configuration, and an advantageous effect other than those described above will be clarified in description of an embodiment described below.

DESCRIPTION OF EMBODIMENTS

Figure 1:
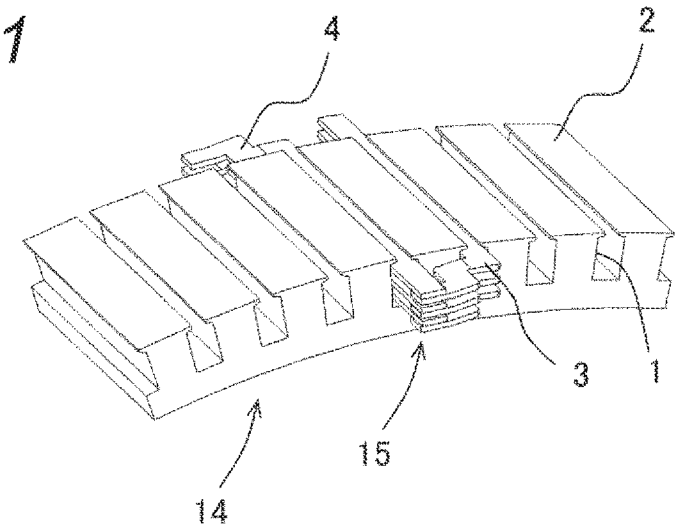
FIG. 1 is a perspective view of a main part of an electromagnetic component including a winding according to the present embodiment.

Hereinafter, a configuration of a winding according to an embodiment of the present invention will be described with reference to the drawings. The winding is used for electromagnetic components such as a transformer, a generator, and a motor. Note that, in the drawings, the same reference numerals denote the same parts.

First, a configuration around a winding 15 will be described with reference to FIG. 1. FIG. 1 is a perspective view of a main part of an electromagnetic component including the winding 15 according to the present embodiment. In the example of FIG. 1, the electromagnetic component is a stator 14 of a motor (rotary electric machine). The stator 14 includes a stator core 2 (core) and the winding 15. The winding 15 includes a segment coil 3 (first conductor) and a segment coil 4 (second conductor).

Figure 2:
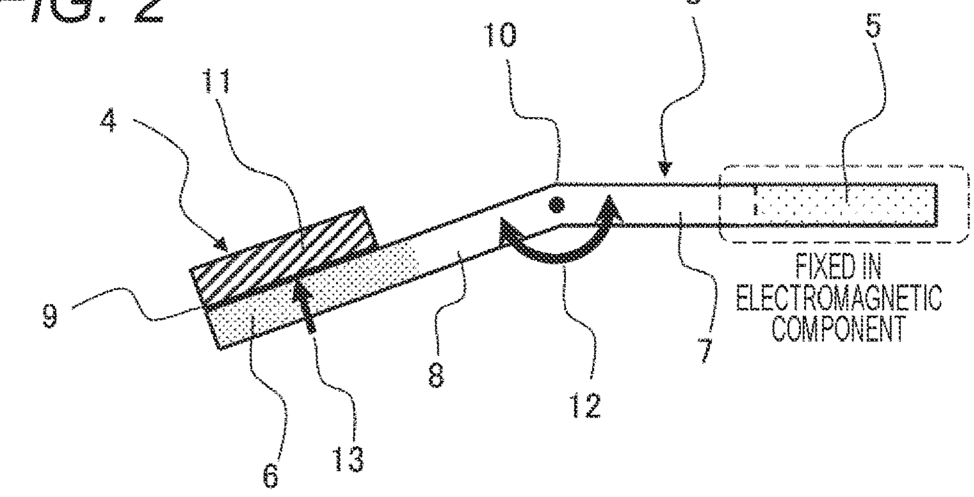
FIG. 2 is a diagram of a segment coil (first conductor) and a segment coil (second conductor) constituting the winding as viewed from an axial direction of a motor (rotary electric machine).

(Configuration of winding) FIG. 2 is a view of the segment coil 3 (first conductor) and the segment coil 4 (second conductor) constituting the winding 15 as viewed from the axial direction of a motor (rotary electric machine).

In the stator (electromagnetic component), the segment coil 3 (first conductor) and the segment coil 4 (second conductor) are electrically connected. The segment coil 3 (first conductor) and the segment coil 4 (second conductor) are fixed in the stator (electromagnetic component). At least one of the segment coil 3 (first conductor) and the segment coil 4 (second conductor) has a bent portion 10.

A connection portion 6 of the segment coil 3 (first conductor) is brought into pressure-contact with an insertion portion 11 of the segment coil 4 (second conductor) by using a restoring force 12 due to residual stress of the bent portion 10. As a result, a pressing force 13 is transmitted from the segment coil 3 (first conductor) to the segment coil 4 (second conductor) via a connection surface 9.

The bent portion 10 has residual stress $\sigma 1$ in a direction in which the connection portion 6 is pressed against the segment coil 4 (second conductor). When temperature rises, the restoring force 12 that causes deformation in a direction of releasing the residual stress $\sigma 1$ is generated, and thus, the connection portion 6 of the segment coil 3 (first conductor) is pressed against the insertion portion 11 of the segment coil 4 (second conductor) by the restoring force 12 due to the residual stress $\sigma 1$.

Note that the segment coil 3 (first conductor) has an intermediate portion 7 (first intermediate portion) between the bent portion 10 and the insertion portion 5, and has an intermediate portion 8 (second intermediate portion) between the bent portion 10 and the connection portion 6. The insertion portion 5 of the segment coil 3 (first conductor) is fixed in a stator (electromagnetic component).

The connection surface 9 is a surface on which the segment coil 3 (first conductor) and the segment coil 4 (second conductor) are electrically connected. The segment coil 3 (first conductor) and the segment coil 4 (second conductor) are manufactured aiming at a dimensional relationship in which they do not interfere and do not create a gap, and the connection portion 6 is pressed against the insertion portion 11 by the restoring force 12.

The bent portion 10 only needs to be bent from a flat plate, and size of a bend R is not limited. That is, the bent portion 10 may be an arc. In order to use a restoring force due to residual stress, the bent portion 10 closest to the insertion portion 5 (fixing portion) of the segment coil 3 (first conductor) protrudes toward the side of the segment coil 4 (second conductor).

(Configuration of stator) As illustrated in FIG. 1, the stator 14 of a rotary electric machine includes the stator core 2 (core) in which a slot 1 is formed, and a plurality of the segment coils 3 and 4 (coils) inserted into the slot 1 and having a rectangular cross section. As illustrated in FIG. 2, each of a plurality of the segment coils 3 (coils) includes the insertion portion 5 inserted into the slot 1, the connection portion 6 electrically connected to another one of the segment coils 4 (coil) among a plurality of the segment coils 3 and 4 (coils), and an intermediate portion (whole) formed between the insertion portion 5 and the connection portion 6. Note that the intermediate portion (whole) includes an intermediate portion 7 (first intermediate portion) and an intermediate portion 8 (second intermediate portion).

The connection surface 9 facing another one of the segment coils 4 (coils) in a radial direction of the motor (rotary electric machine) is formed in the connection portion 6. In a case of being viewed from a rotation axis direction (axial direction) of the motor (rotary electric machine), the intermediate portion (whole) has at least one of the bent portions 10. The bent portion 10 closest to the insertion portion 5 forms a protrusion on the side of another one of the segment coils 4 (coil).

Figure 3A:
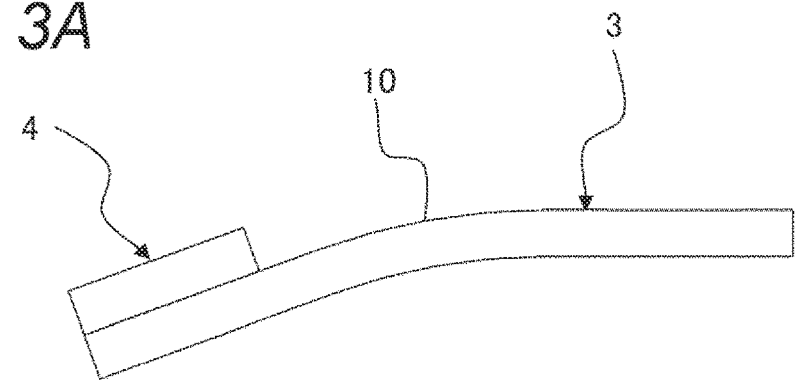
FIG. 3A is a diagram illustrating an example in which a shape of a bent portion is an arc.
Figure 3B:
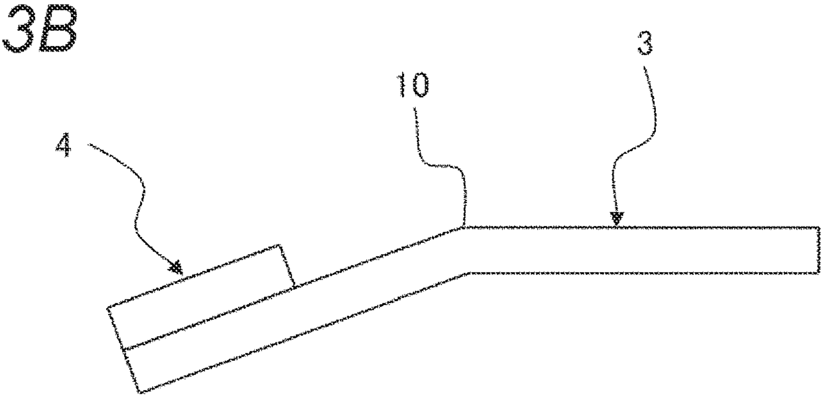
FIG. 3B is a diagram illustrating an example in which a shape of the bent portion is an angular bend (inverted V-shape).

(Details of configuration) As illustrated in FIG. 3A, a shape of the bent portion 10 as viewed from the axial direction of the motor (rotary electric machine) may be an arc. Further, as illustrated in FIG. 3B, a shape of the bent portion 10 as viewed from the axial direction of the motor (rotary electric machine) may be an angular bend (inverted V-shape).

Figure 4A:
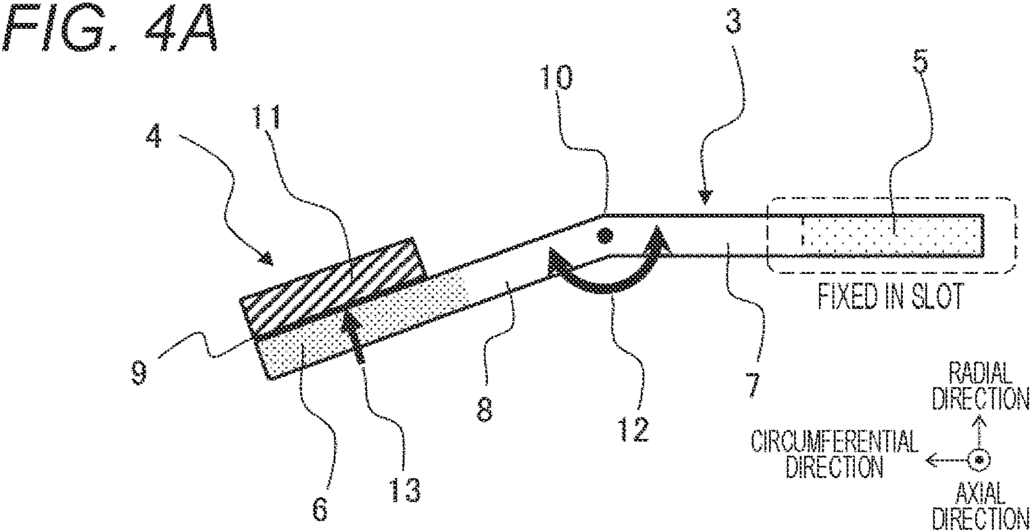
FIG. 4A is an explanatory diagram of a restoring force.
Figure 4B:
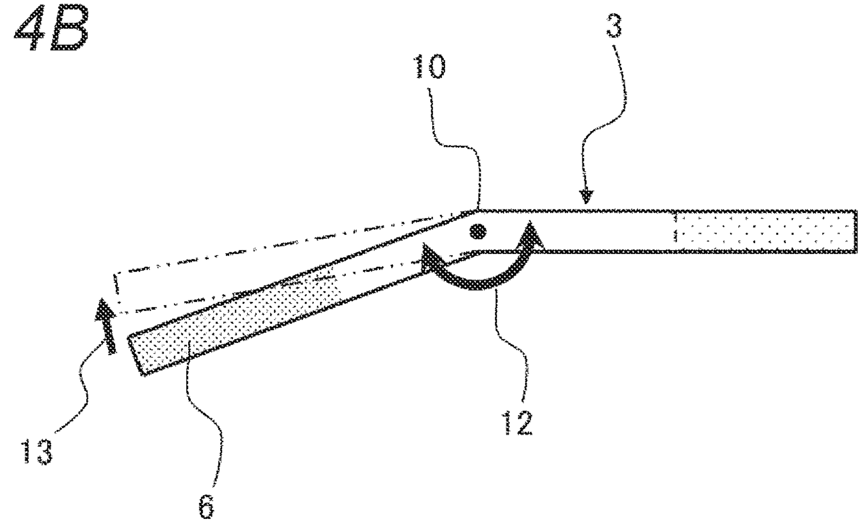
FIG. 4B is an explanatory diagram of a pressing force.

The restoring force 12 illustrated in FIG. 4A is a force that causes deformation in a direction in which the residual stress $\sigma 1$ when the bent portion 10 is bent is released, and has property of returning straight when heat is applied, an external force is applied, or time elapses. The pressing force 13 illustrated in FIG. 4B is a force by which the connection portion 6 is pressed against the insertion portion 11 of the segment coil 4 (second conductor) with the bent portion 10 as a fulcrum by the restoring force 12 due to the residual stress $\sigma 1$.

When a protrusion shape of the bent portion 10 is about to return to the original flat plate before bending by the restoring force 12 due to the residual stress $\sigma 1$, the connection portion 6 is pressed against the insertion portion 11, and welding joining such as welding is easily performed. If a welded portion is not in close contact, joint failure is likely to occur. The bent portion 10 needs to protrude in a direction of the insertion portion 11 of the segment coil 4 (second conductor).

The intermediate portion 7 (first intermediate portion) illustrated in FIG. 4A is located between the insertion portion 5 and the bent portion 10 and does not move. The intermediate portion 8 (second intermediate portion) is located between the bent portion 10 and the connection portion 6, and moves in a direction of the insertion portion 11 of the segment coil 4 (second conductor) together with the connection portion 6.

Figure 5:
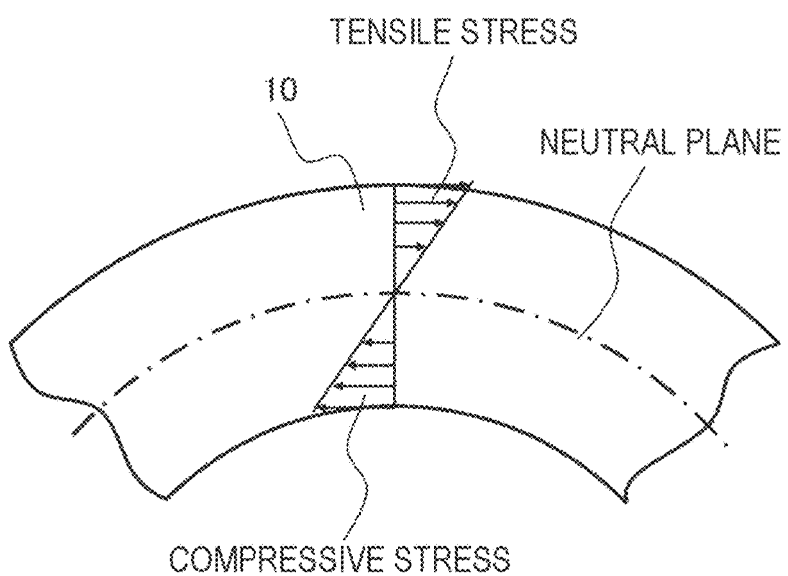
FIG. 5 is an enlarged view of the bent portion.

FIG. 5 is an enlarged view of the bent portion 10. Tensile stress is generated outside a bend of the bent portion 10. The outer side has larger stress and is a plastic deformation region, and there is also an elastic region near a neutral plane. Since it is pulled and stretched, it has property of shrinking. Compressive stress is generated inside a bend of the bent portion 10. The inner side has larger stress and has a plastic deformation region, and there is also an elastic region near a neutral plane. Since it is compressed and crushed, it has property of extending. The neutral plane is a plane of zero stress where tensile stress and compressive stress switch. In practice, the outer side is elongated and a material becomes insufficient, and the material becomes excessive on the inner side. Therefore, as the degree of bending becomes stricter (large plate thickness, small bending r), the neutral plane moves to the inner side than the plate thickness center.

Figure 6A:
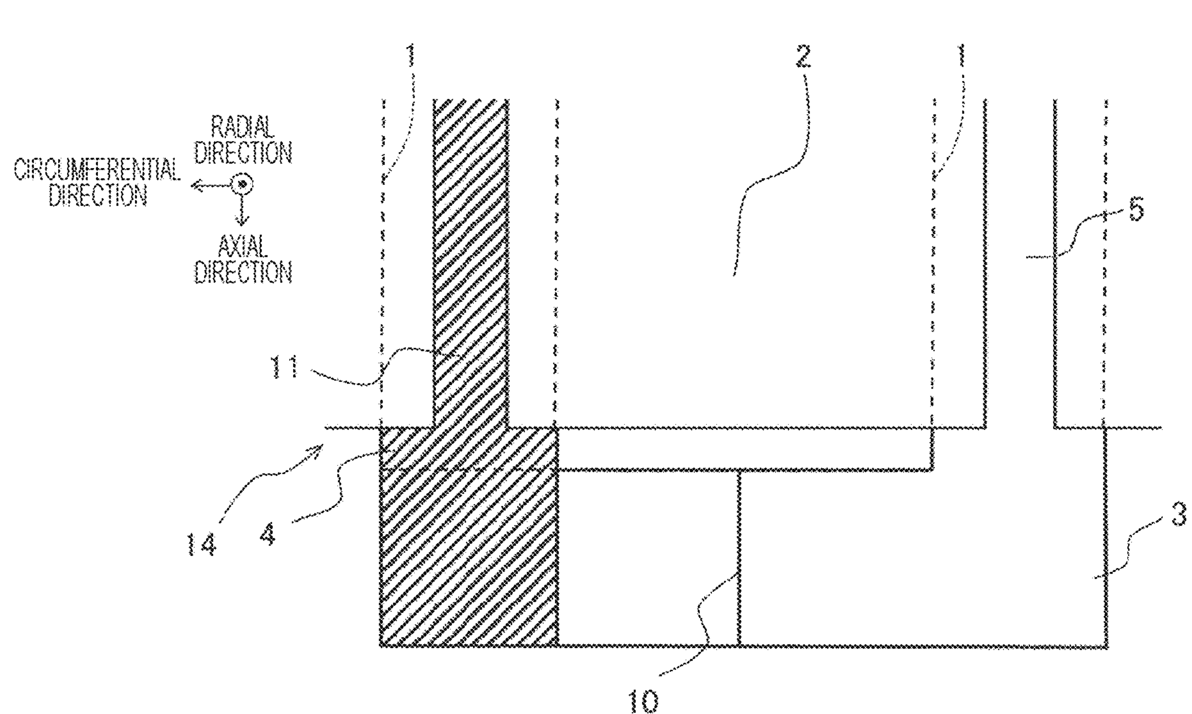
FIG. 6A is a diagram for explaining a positional relationship between a plurality of segment coils.
Figure 6B:
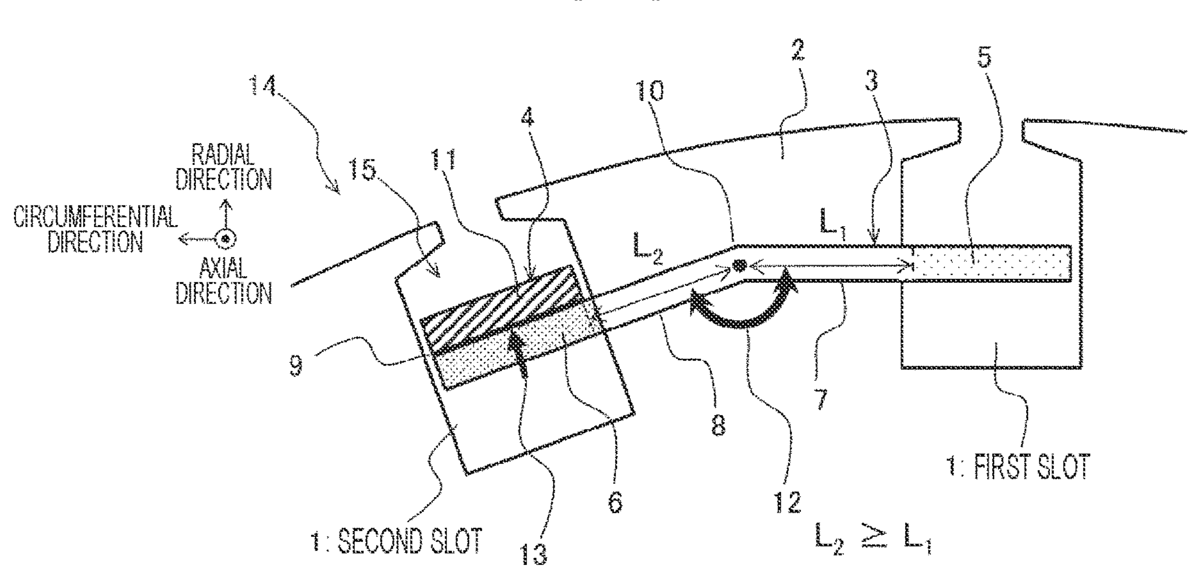
FIG. 6B is a diagram of the plurality of the segment coils illustrated in FIG. 6A as viewed from the axial direction.

As illustrated in FIGS. 6A and 6B, a plurality of segment coils included in the stator 14 of the motor (rotary electric machine) includes the segment coil 3 (first coil) inserted into the slot 1 (first slot) and the segment coil 4 (second coil) inserted into the slot 1 (second slot) adjacent to the slot 1 (first slot) in a circumferential direction.

The bent portion 10 is formed at a position equidistant from the insertion portion 5 of the segment coil 3 (first coil) and the insertion portion 11 of the segment coil 4 (second coil) or closer to the insertion portion 5 of the segment coil 3 (first coil) than the insertion portion 11 of the segment coil 4 (second coil).

Since the bent portion 10 serves as a fulcrum and the connection portion 6 rotationally moves, a movement amount of the connection portion 6 can be secured at a smaller rotation angle as a length L2 of an arm is longer. Further, if a gap between the connection portion 6 and the segment coil 4 (second coil) is the same, the shorter the length L2 of an arm, the larger the rotation angle, so that the connection portion 6 is inclined and the inclined connection surface 9 is less likely to come into surface contact. This is likely to cause poor welding. For this reason, since the length L2 of an arm is desirably long, the length L2 is limited to L2≥L1. Even outside this range, there is some effect.

Note that although segment coils of the slots 1 adjacent to each other of the stator core 2 are connected to each other, the segment coils may be connected without the slot 1 as long as there is a bending point. FIGS. 6A and 6B illustrate an example in which one bending point is provided, and thus, although the same layers are not connected, a plurality of bending points may be provided to connect the same layers.

Figure 7:
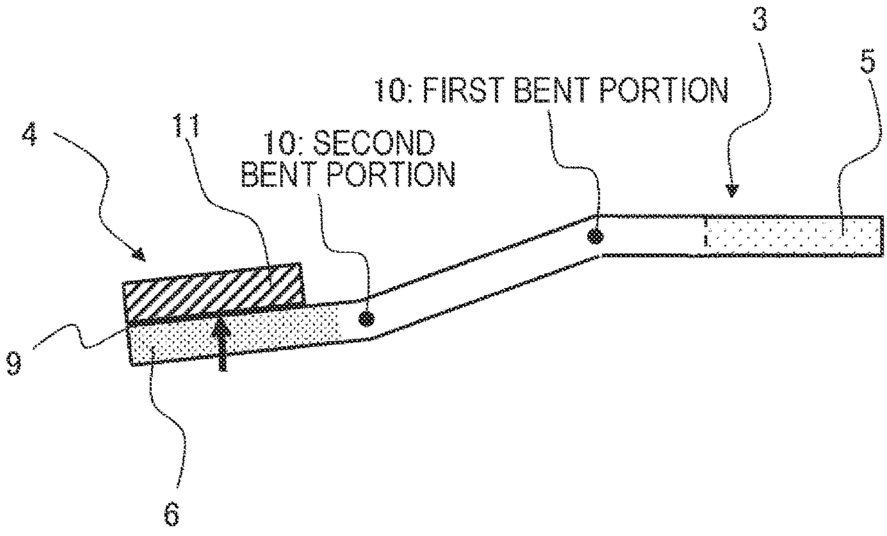
FIG. 7 is a diagram for explaining two of the bent portions.

As illustrated in FIG. 7, a plurality of segment coils (coils) include the segment coil 3 (first coil) inserted into the slot 1 (first slot) and the segment coil 4 (second coil) inserted into the slot 1 (second slot) adjacent to the slot 1 (first slot) in a circumferential direction.

The bent portion includes the bent portion 10 (first bent portion) formed on the side of the segment coil 3 (first coil) close to the insertion portion 5 and having a protruding shape on the segment coil 4 (second coil) side, and the bent portion 10 (second bent portion) formed on the side of the segment coil 4 (second coil) close to the insertion portion 11 and having a protruding shape on the side opposite to the bent portion 10 (first bent portion).

Figure 8:
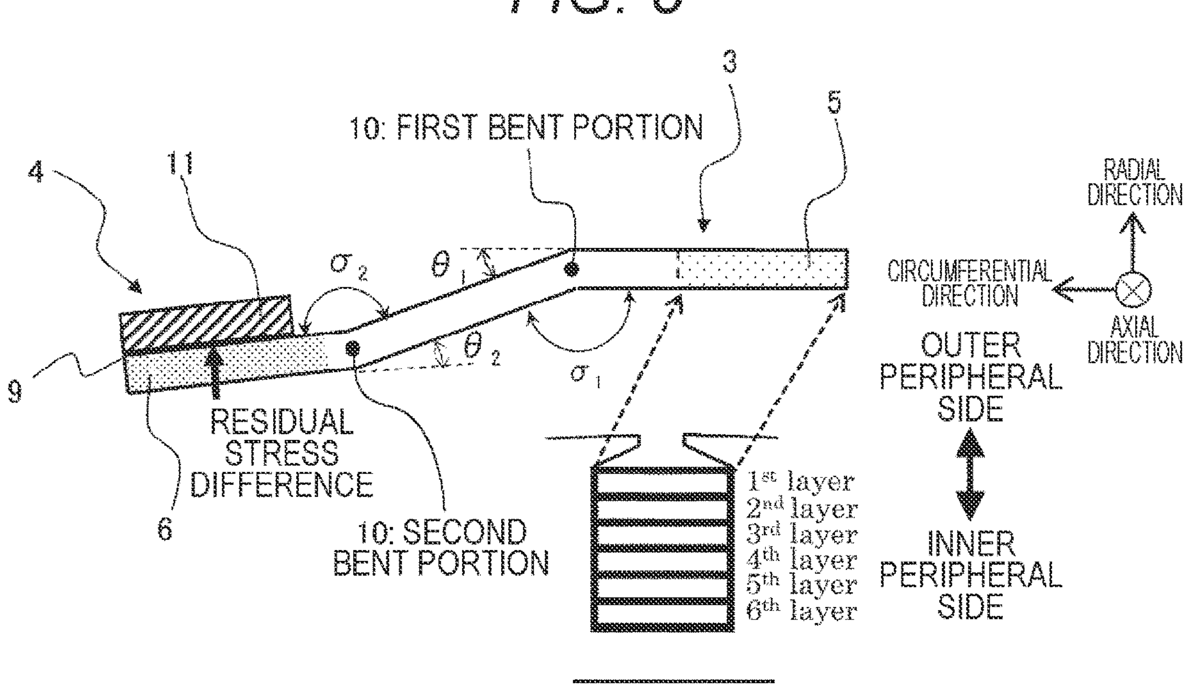
FIG. 8 is an explanatory diagram of a magnitude relationship of residual stress.

FIG. 8 is a diagram for explaining a magnitude relationship of residual stress. Conditions for making residual stress large are (i) to (iv) below. (i) The thinner the plate thickness, the larger the residual stress. (ii) The greater the tensile strength of a material, the larger the residual stress. (iii) The larger the bending angle, the larger the residual stress. (iv) The larger the bend R, the larger the residual stress.

When the connection portion 6 of the segment coil 3 (first coil) is arranged on the inner peripheral side of the insertion portion 11 of the segment coil 4 (second coil), a relationship below is established.

Bending angle θ1 of first bent portion>Bending angle θ2 of second bent portion

Residual stress σ1 of first bent portion>Residual stress σ2 of second bent portion When the insertion portion 5 of the segment coil 3 (first coil) is set as a fixing point, stress for deforming the connection portion 6 of the segment coil 3 (first coil) in an outer peripheral direction remains from a difference between σ1 and σ2. Due to this stress, the connection portion 6 of the segment coil 3 (first coil) is pressed against the insertion portion 11 of the segment coil 4 (second coil).

Figure 9:
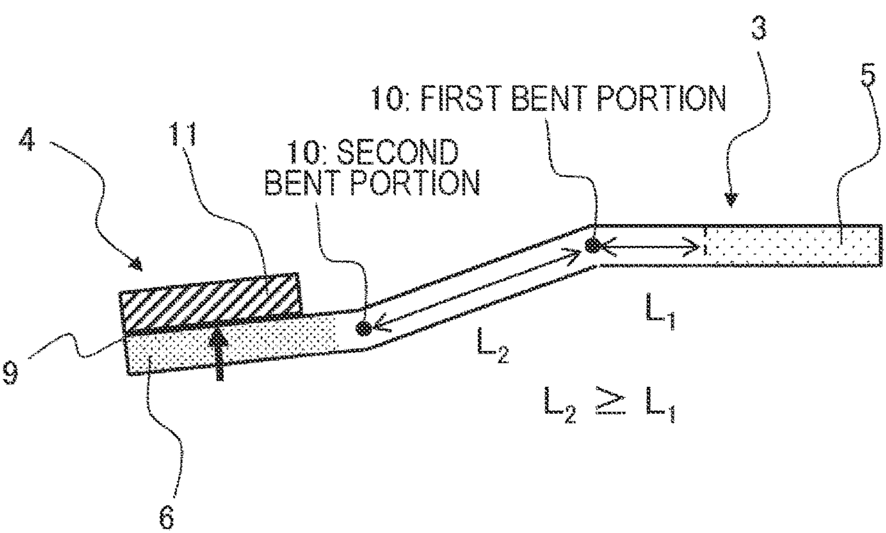
FIG. 9 is an explanatory view of relative positions of two of the bent portions.

As illustrated in FIG. 9, the bent portion 10 (first bent portion) and the bent portion 10 (second bent portion) are formed such that a distance L2 between these bent portions is larger than a distance L1 between the bent portion 10 (first bent portion) and the insertion portion 5 of the segment coil 3 (first coil).

Since the bent portion 10 (first bent portion) serves as a fulcrum and the connection portion 6 rotationally moves, a movement amount of the connection portion 6 can be secured at a smaller rotation angle as the length L2 of an arm is longer. Further, if a gap between the connection portion 6 and the segment coil 4 (second coil) is the same, the shorter the length L2 of an arm, the larger the rotation angle, so that the connection portion 6 is inclined and the inclined connection surface 9 is less likely to come into surface contact. This is likely to cause poor welding. For this reason, since the length L2 of an arm is desirably long, the length L2 is limited to L2 L1. Even outside this range, there is some effect.

Figure 10:
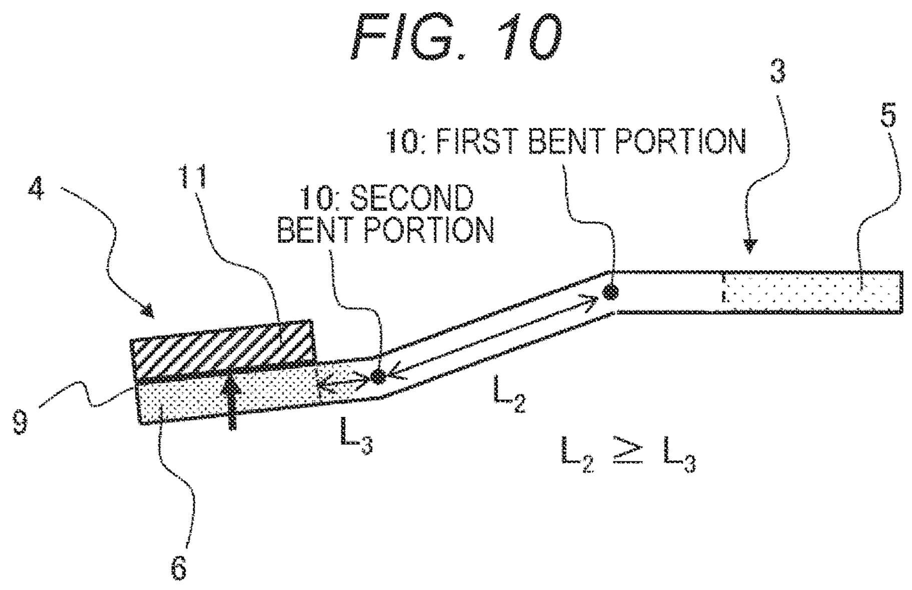
FIG. 10 is an explanatory view of relative positions of two of the bent portions.

As illustrated in FIG. 10, the bent portion 10 (first bent portion) and the bent portion 10 (second bent portion) are formed such that the distance L2 between these bent portions is larger than a distance L3 between the insertion portion 11 of the segment coil 4 (second coil) and the bent portion 10 (second bent portion).

The bent portion 10 (first bent portion) deforms in a direction in which the connection portion 6 is made closer to the segment coil 4 (second coil), but the bent portion 10 (second bent portion) protrudes in the opposite direction and deforms in a direction in which the connection portion 6 moves away from the segment coil 4 (second coil).

The length L2 of an arm+L3 of the bent portion 10 (first bent portion) is preferably long, but the length L3 of an arm of the bent portion 10 (second bent portion) is preferably short. If the length is long, deformation in a direction in which the connection portion 6 moves away from the segment coil 4 (second coil) becomes large. For this reason, since the length L3 of an arm of the bent portion 10 (second bent portion) is desirably shorter, the length L3 is limited to L2≥L3. Even outside this range, there is some effect.

As illustrated in FIGS. 11 to 14, the segment coil 3 (first coil) has two or more of the bent portions 10 at different positions in the rotation axis direction of the motor (rotary electric machine). The segment coil 3 (first coil) is inserted into the first layer of the first slot, and the segment coil 4 (second coil) is inserted into the second slot. The winding 15 includes a segment coil 4_1 (third coil) inserted into a layer adjacent to the segment coil 4 (second coil) in the radial direction of the motor (rotary electric machine) in the same second slot as the segment coil 4 (second coil).

Figure 11:
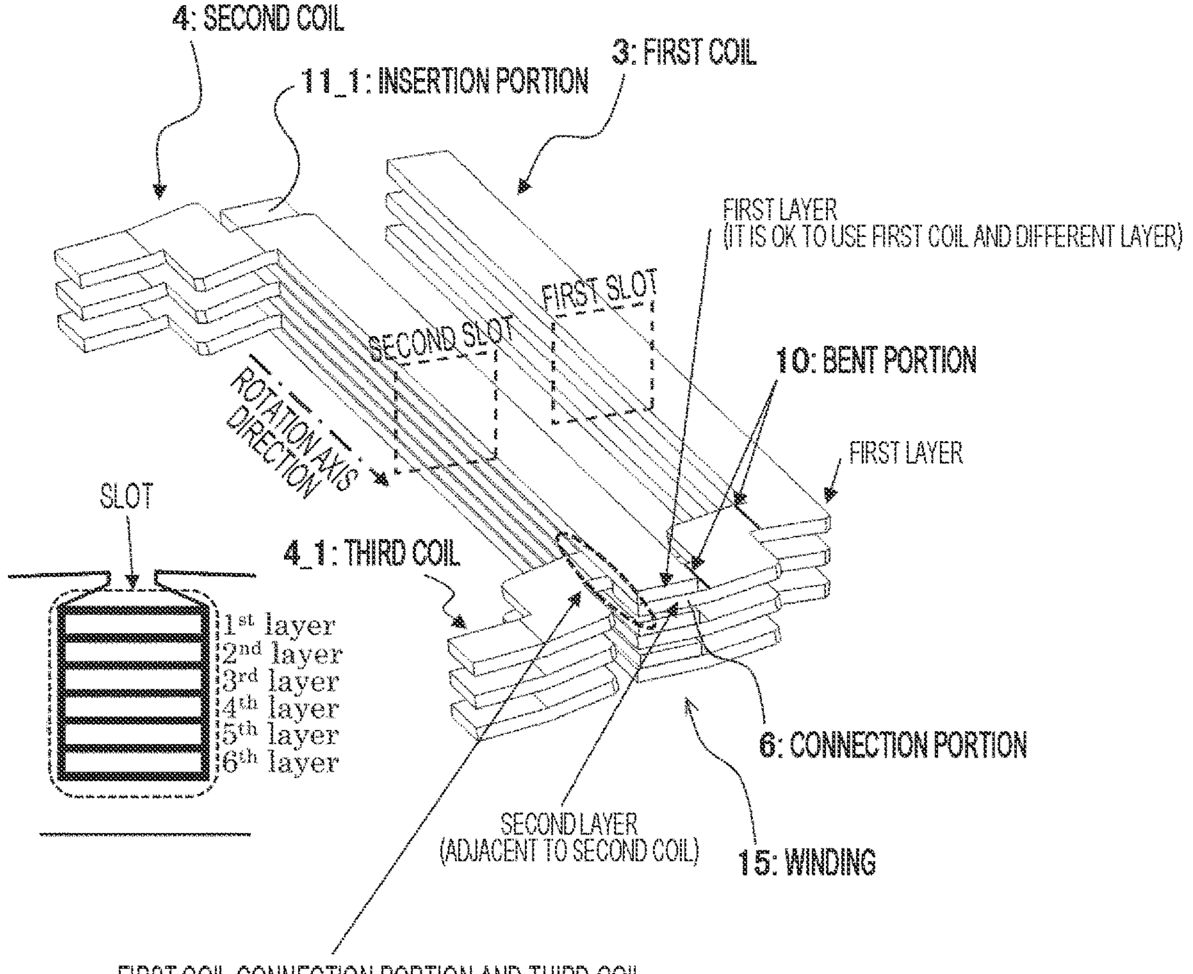
FIG. 11 is an explanatory diagram of a positional relationship between a plurality of the segment coils.
Figure 12A:
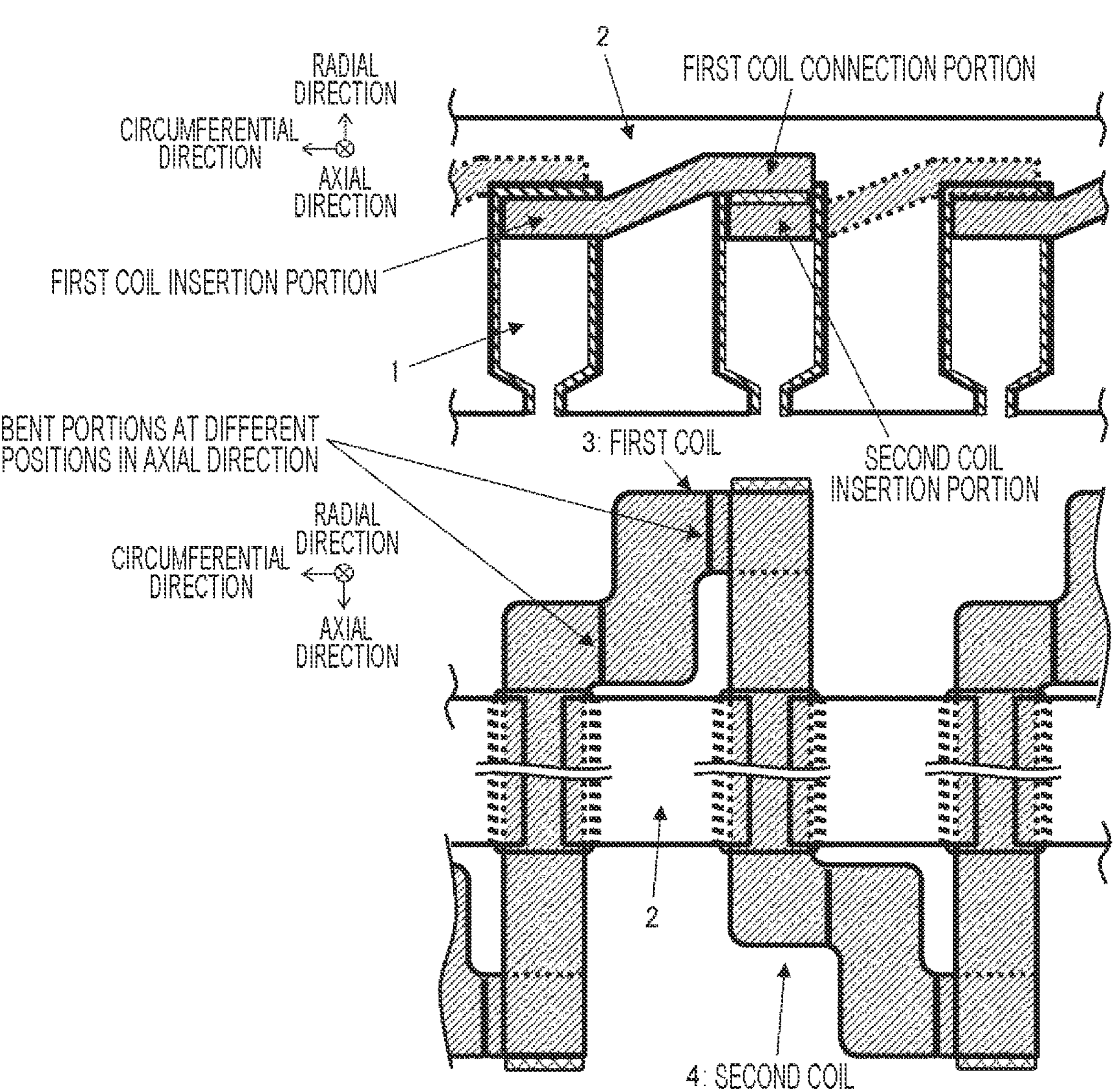
FIG. 12A is an explanatory diagram of a positional relationship between a plurality of the segment coils.
Figure 12B:
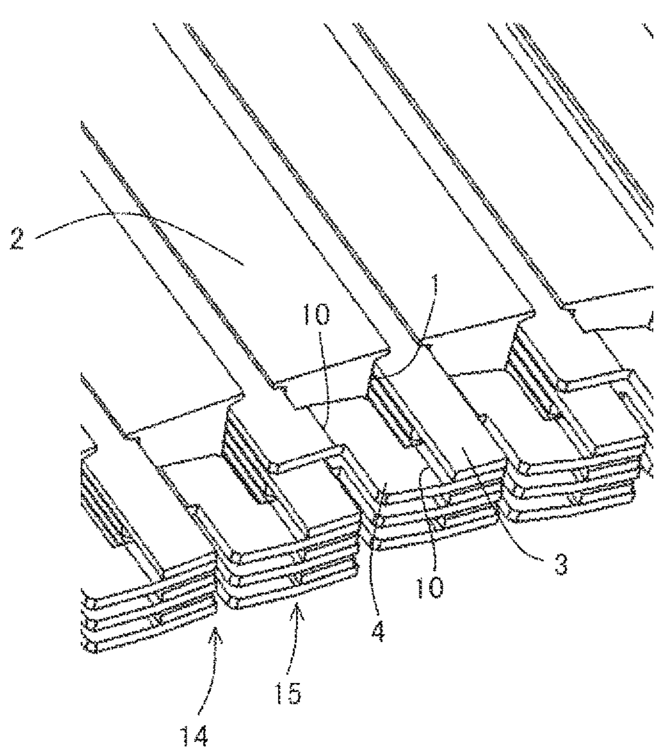
FIG. 12B is a partially enlarged perspective view of a stator, illustrating a positional relationship between a plurality of the segment coils.
Figure 13:
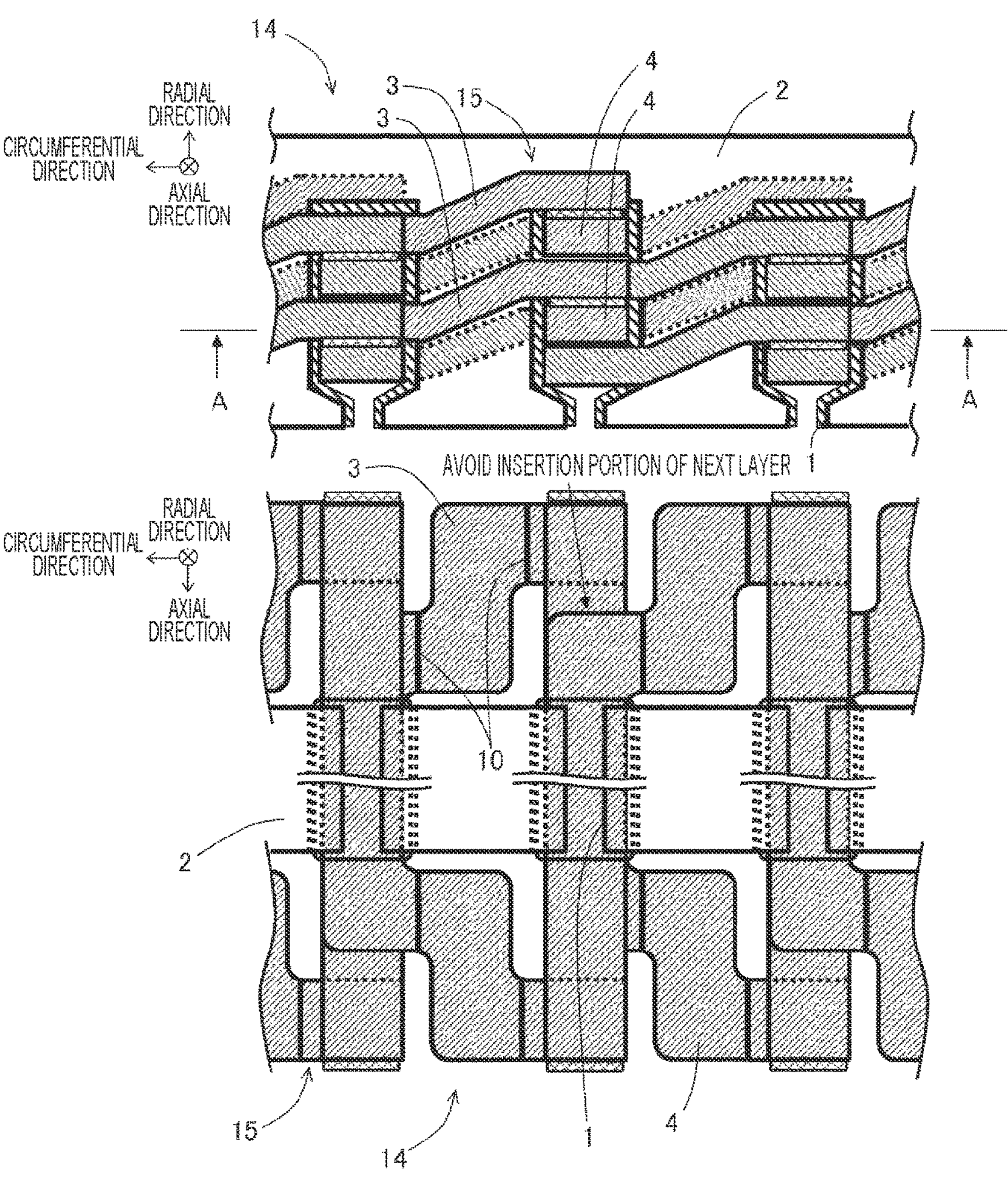
FIG. 13 is an explanatory diagram of a positional relationship between a plurality of the segment coils.
Figure 14:
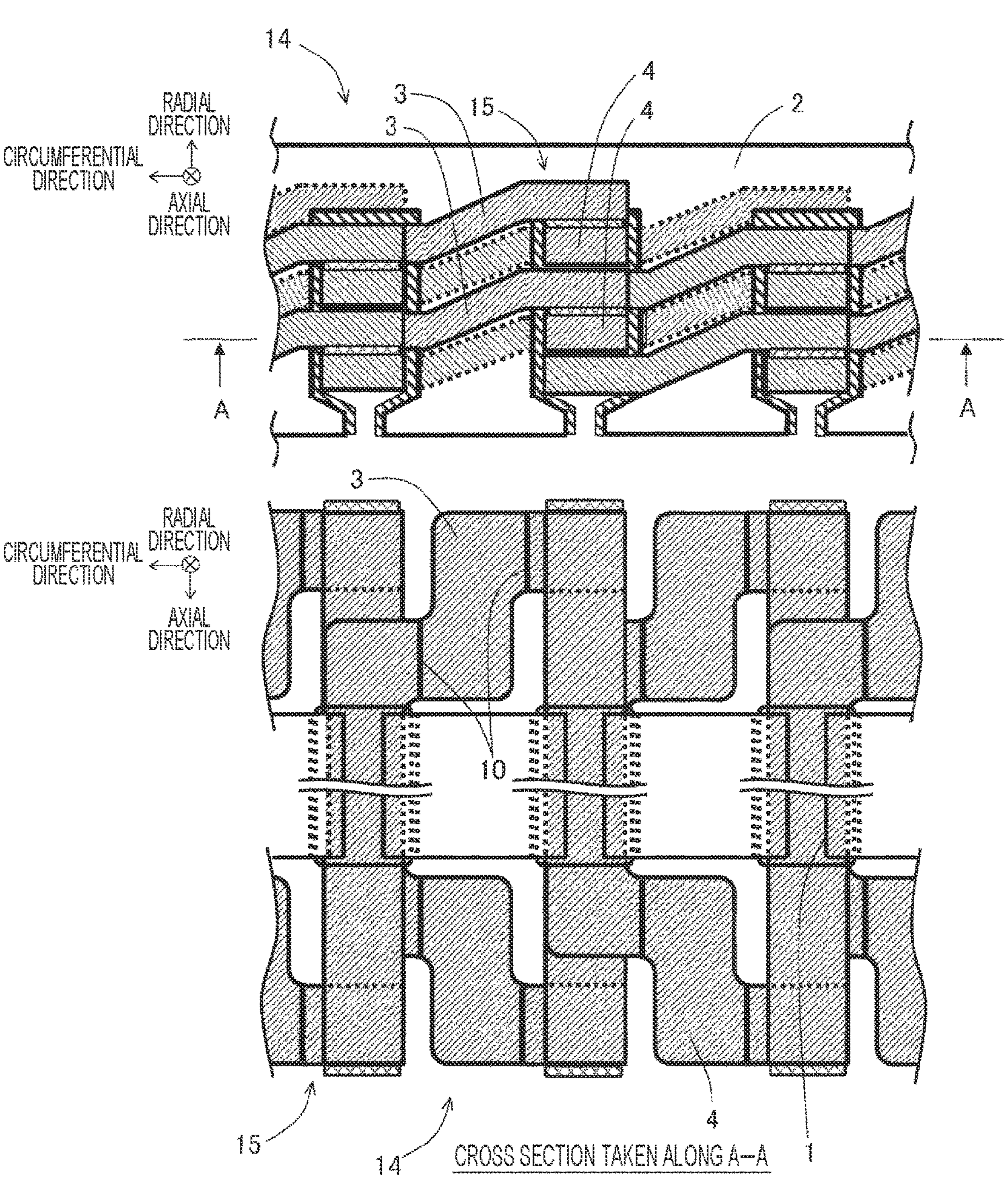
FIG. 14 is an explanatory diagram of a positional relationship between a plurality of the segment coils.

The connection portion 6 of the segment coil 3 (first coil) is located in the same layer as the insertion portion 11_1 of the segment coil 4_1 (third coil) and is arranged outside in the rotation axis direction shown in FIG. 11.

In order to form the connection portion 6 in the same layer, it is necessary to process each conductor plate thickness to ½. However, if the connection portion 6 of the segment coil 3 (first coil) and the insertion portion 11_1 of the segment coil 4_1 (third coil) are arranged in the same layer by shifting the bent portion 10 in the axial direction, the radial dimension can be suppressed without processing the plate thickness to ½. However, as a weak point, the dimension in the axial direction is increased.

Note that the second slot is a slot into which the segment coil 4 (second coil) and the segment coil 4_1 (third coil) are inserted. However, the second slot is not necessarily adjacent to the first slot. The layer is a coil position in a slot. In the example of FIG. 11, there are a total of six layers of a first layer to a sixth layer.

Figure 15:
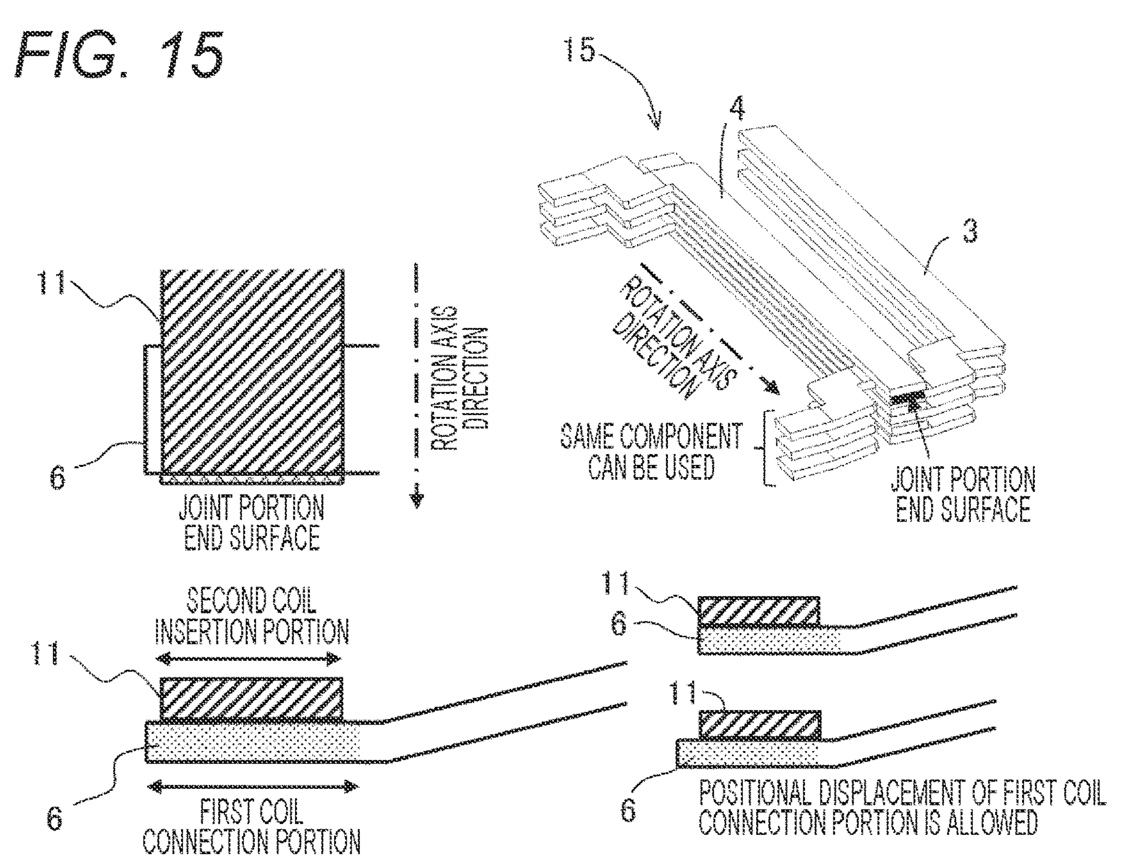
FIG. 15 is an explanatory diagram of a circumferential length of an insertion portion.

As illustrated in FIG. 15, a joint portion end surface is configured in a direction substantially perpendicular to the rotation axis of the motor (rotary electric machine). A circumferential length of the connection portion 6 of the segment coil 3 (first coil) is larger than a circumferential length of the insertion portion 11 of the segment coil 4 (second coil).

If the joint portion end surface is perpendicular to the rotation axis and the circumferential length of the connection portion 6 of the segment coil 3 (first coil) is larger than the insertion portion 11 (fixed to a slot) of the segment coil 4 (second coil), the joint portion can be secured even if the connection portion 6 of the segment coil 3 (first coil) is displaced in the circumferential direction. This enables absorption of component tolerance and assembly tolerance.

Further, a coil of the motor (rotary electric machine) is generally formed by placing a plurality of layers on each other (winding a plurality of layers many turns) in the radial direction. However, since a coil on the inner peripheral side and a coil on the outer peripheral side have different circumferential lengths, there is a difference in an inter-coil distance, and it is necessary to use different components. In the present embodiment, the same component can be used by making a length difference larger than a circumferential length difference. This leads to reduction in the number of molds, reduction in cost due to a mass production effect by increase in the number of the same components, and the like.

Figure 16:
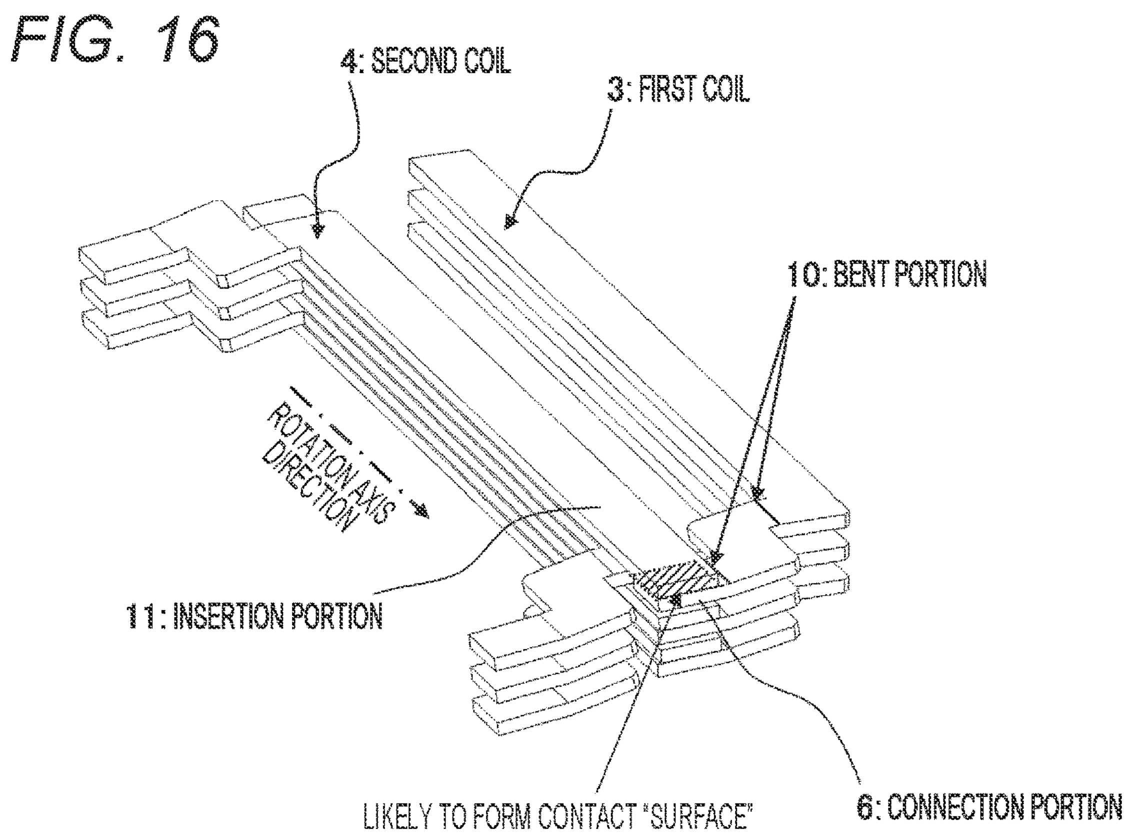
FIG. 16 is a diagram illustrating that the bent portion is substantially parallel to a rotation axis.

As illustrated in FIG. 16, the bent portion 10 is configured to be substantially parallel to the rotation axis. With a structure of being bent parallel to the rotation axis, surfaces of the insertion portion 11 of the segment coil 4 (second coil) and the connection portion 6 of the segment coil 3 (first coil) can be made relatively easily parallel and brought into surface contact.

Although surface contact is possible even if bending is performed at an angle with respect to the rotation axis, a 3D twisted shape is formed, and thus the degree of difficulty in production increases.

When the joint portions are in surface contact with each other properly, joint quality of welding is improved, and dissimilar metal joining by soldering, brazing, and the like other than welding can also be performed.

Figure 17:
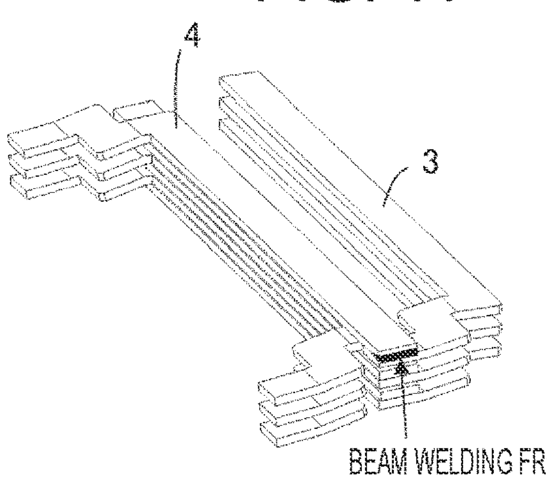
FIG. 17 is an explanatory diagram of welding.
Figure 17:
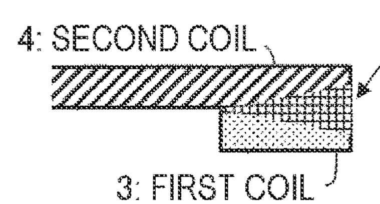

As illustrated in FIG. 17, the segment coil 3 (first coil) and the segment coil 4 (second coil) are fixed by, for example, beam welding. The beam welding is high-density energy welding such as electron beam welding (EBW) or laser welding. Since deep welding penetration can be realized with a narrow width, welding can be performed from a side surface even for a flat cross-sectional coil. Since heating and melting can be performed in a spot manner, distortion is relatively small, and welding can be performed even for a thin plate.

Note that welding such as arc welding such as TIG welding or beam welding such as EBW may be performed, or brazing or soldering may be performed. A penetration depth of welding may be equal to or greater than a plate thickness. The present inventors confirmed by actual measurement that there is no decrease in electric resistance. A material of the coil is often copper, but may be a conductor such as aluminum. It is also possible to perform dissimilar metal joining of copper, aluminum, and the like.

Figure 18A:
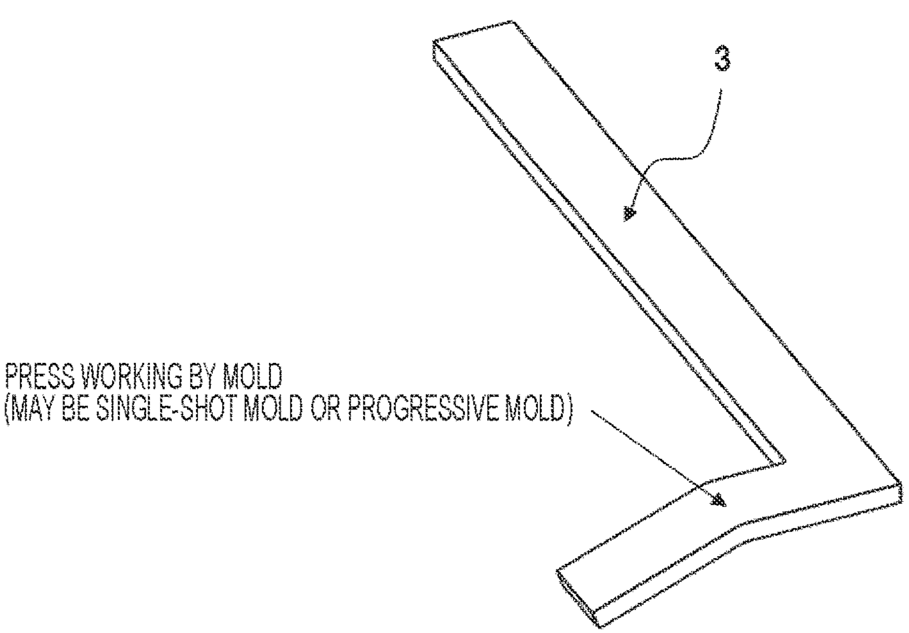
FIG. 18A is a diagram illustrating a method of manufacturing a coil, and illustrates punching molding of a plate material.
Figure 18B:
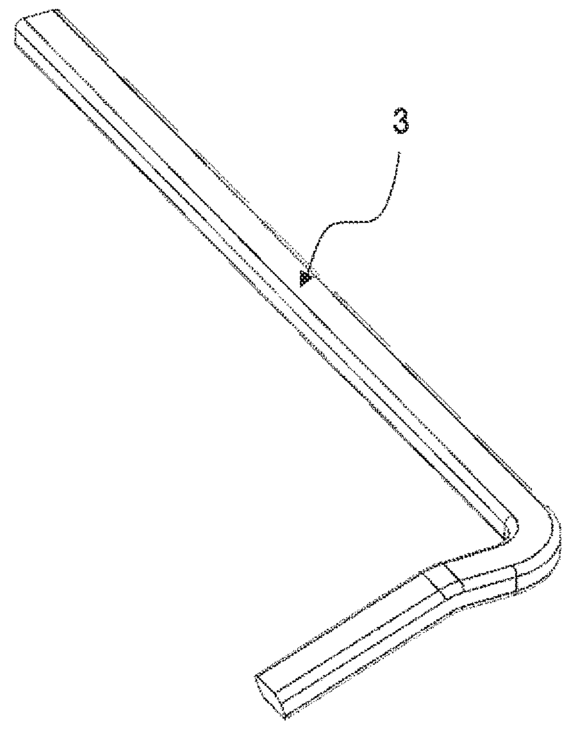
FIG. 18B is a diagram illustrating a method of manufacturing the coil, and illustrating bending of a rectangular magnet wire.

(Method of manufacturing coil) FIGS. 18A and 18B are diagrams for explaining a method of manufacturing the segment coil 3 (first coil). The segment coil 3 (first coil) is manufactured by, for example, punching molding of a plate material (see FIG. 18A) and bending of a rectangular wire magnet wire (see FIG. 18B). Note that the same applies to a method of manufacturing coils such as the segment coil 4 (second coil) and the segment coil 4_1 (third coil).

The coil may be formed by punching a plate material or bending a rectangular wire. The coil may be a pure material or a magnet wire with an insulating film.

Figure 19:
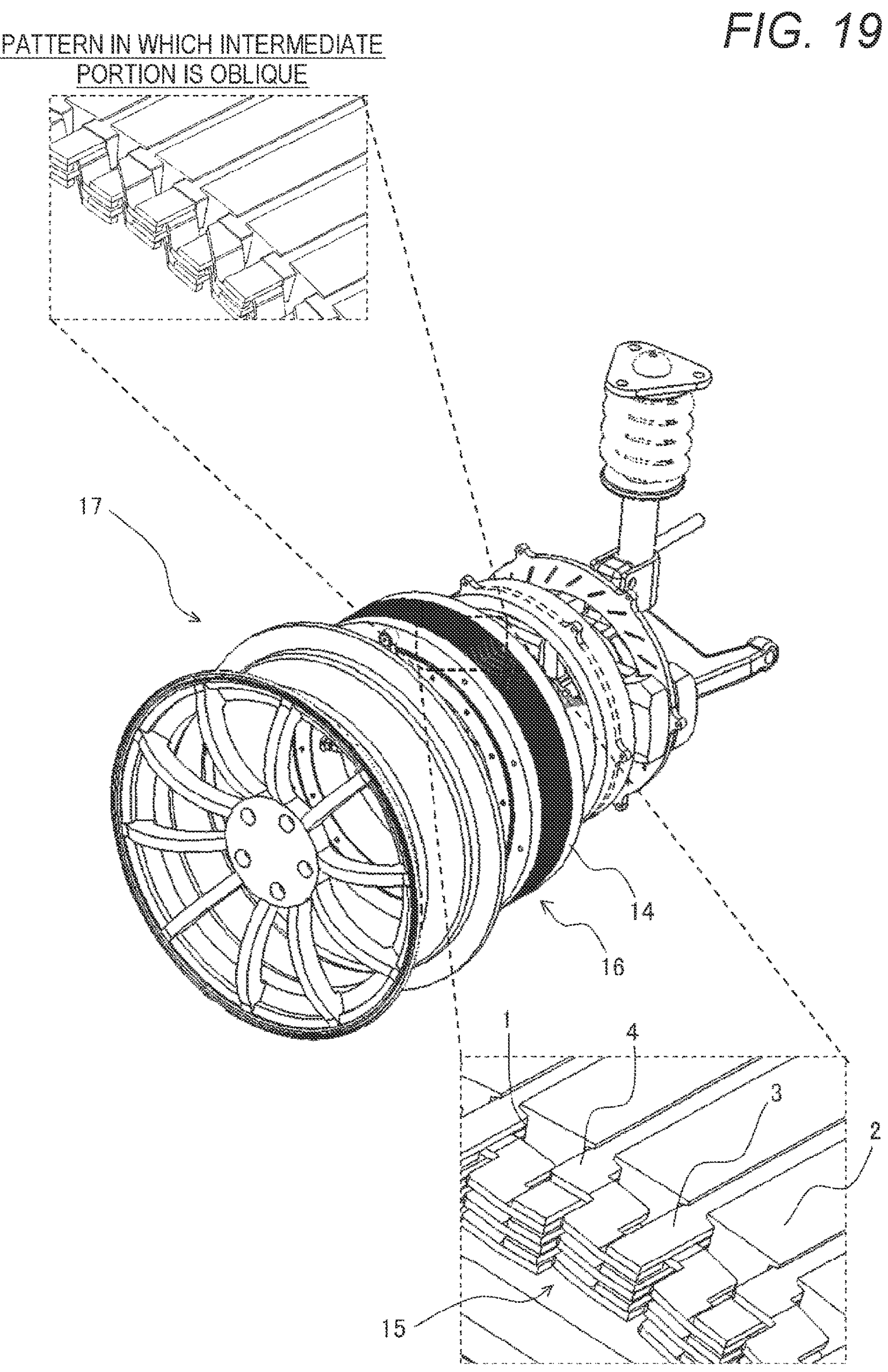
FIG. 19 is a perspective view of a wheel including a motor (rotary electric machine) using the windings of the present embodiment.

(In-wheel motor) FIG. 19 is a perspective view of a wheel 17 including a motor (rotary electric machine) 16 using the winding 15 of the present embodiment. In this example, an outer rotor type motor is incorporated in the wheel 17 as the in-wheel motor 16. However, the motor 16 is not limited to that of the outer rotor type, and may be of an inner rotor type. A flat coil having a rectangular cross section is inserted into the slot 1 of the stator core 2 from the rotation axis direction and fixed in the slot 1.

The coil may have one layer or a plurality of layers. In the example of FIG. 19, the coil has six layers. A connection portion of the coil is joined from the axial direction by beam welding such as electron beam welding (EBW) or laser welding, or TIG welding. Soldering or brazing may also be performed.

As described above, according to the present embodiment, an assembly process can be simplified while joint quality of a coil end is improved.

Note that the present invention is not limited to the above embodiment and includes a variety of variations. For example, the above embodiment is described in detail for easy understanding of the present invention, and the present invention is not necessarily limited to an embodiment that includes all the described configurations. Further, part of a configuration of a certain embodiment can be replaced with a configuration of another embodiment, and a configuration of a certain embodiment can be added to a configuration of another embodiment. Further, for part of a configuration of each embodiment, other configurations may be added, removed, or replaced with.

The embodiment of the present invention may have aspects described below.

(2). A stator for a rotary electric machine including (a) a core in which a slot is formed and (b) a plurality of coils each having a rectangular cross section to be inserted into the slot, in which (c) each of the plurality of coils includes the insertion portion 5 to be inserted into the slot, (d) the connection portion 6 electrically connected to the insertion portion 11 of another one of the plurality of coils, (e) the intermediate portion 7 formed between the insertion portion and the connection portion, (f) on the connection portion, the connection surface 9 facing another one of the coils in a radial direction of the rotary electric machine is formed, (g) when viewed from an axial direction of the rotary electric machine, the intermediate portion includes at least one of the bent portions 10, and (h) the bent portion closest to the insertion portion forms a protrusion on the side of another one of the coils.

(3). The stator for a rotary electric machine according to (2), in which each of the plurality of coils includes a first coil inserted into a first slot, and a second coil inserted into a second slot adjacent to the first slot in a circumferential direction, an intermediate portion of the first coil and a connection portion of the second coil are defined as a first connection portion, and the bent portion is formed at a position equidistant from an insertion portion of the first coil and an insertion portion of the second coil or closer to the insertion portion of the first coil than the first connection portion.

(4). The stator for a rotary electric machine according to (2), in which each of the plurality of coils includes a first coil inserted into a first slot and a second coil inserted into a second slot adjacent to the first slot in a circumferential direction, an intermediate portion of the first coil and a connection portion of the second coil are defined as a first connection portion, and the bent portion includes a first bent portion formed on the side close to an insertion portion of the first coil and having a protruding shape on the side of the second coil, and a second bent portion formed on the side close to the first connection portion and having a protruding shape on the side opposite to the first bent portion.

(6). The stator for a rotary electric machine according to (4), in which the first bent portion and the second bent portion are formed in a manner that a distance between the bent portions is larger than a distance between the second bent portion and the first connection portion.

REFERENCE SIGNS LIST

- 1 slot
- 2 stator core
- 3 segment coil
- 4 segment coil
- 4_1 segment coil
- 5 insertion portion
- 6 connection portion
- 7 intermediate portion (first intermediate portion)
- 8 intermediate portion (second intermediate portion)
- 9 connection surface
- 10 bent portion
- 11 insertion portion
- 11_1 insertion portion
- 12 restoring force
- 13 pressing force
- 14 stator (electromagnetic component)
- 15 winding
- 16 motor (rotary electric machine)
- 17 wheel

The invention claimed is:

1. A winding for an electromagnetic component, the winding comprising:

a first conductor; and a second conductor electrically connected to the first conductor, wherein the first conductor is fixed in a first slot in an electromagnetic component and the second conductor is fixed in a second slot in the electromagnetic component, the second slot adjacent to the first slot in a circumferential direction around a periphery of the electromagnetic component, at least the first conductor has at least a first bent portion, and the first conductor fixed in the first slot is brought into pressure-contact with the second conductor fixed in the second slot by a restoring force due to a residual stress of the first bent portion of the first conductor, the second slot configured to hold, at least in part, the second conductor in pressure-contact with the first conductor.

2. A stator for a rotary electric machine including the winding according to claim 1, wherein the first conductor having the first bent portion is configured as a first coil and the second conductor is configured as a second coil, the stator includes:

the electromagnetic component is configured as a core in which the first and second slots are formed around a periphery; and the first and second coils each having a rectangular cross section are disposed in the first slot and the second slot, respectively, each of the first and second coils includes:

an insertion portion to be inserted into the slot; and a connection portion electrically connected to the other the first and second coils; and at least the first coil having at least the first bent portion includes an intermediate portion formed between the insertion portion and the connection portion, a connection surface on each coil facing the other the coils in a radial direction of the rotary electric machine is formed on each respective connection portion, and when viewed from an axial direction of the rotary electric machine, the intermediate portion includes at least the first bent portion, and the first bent portion closest to the insertion portion forms a protrusion toward the connection portion of the second coil.

3. The stator for a rotary electric machine according to claim 2, wherein:

when the first coil is fixed in the first slot; and the second coil is fixed in the second slot adjacent to the first slot in the circumferential direction, a bend in the bent portion is disposed at a position equidistant from the insertion portion of the first coil and the insertion portion of the second coil, or closer to the insertion portion of the first coil than to the insertion portion of the second coil.

4. The stator for a rotary electric machine according to claim 2, wherein the first coil includes:

the first bent portion formed on a side closer to the insertion portion of the first coil and having a protruding shape protruding in a first direction the second coil; and a second bent portion formed on a side closer to the insertion portion of the second coil and having a protruding shape protruding in a second direction, opposite to the first direction of the first bent portion.

5. The stator for a rotary electric machine according to claim 4, wherein the first bent portion and the second bent portion are formed in a manner that a distance between the first bent portion and the second bent portion is larger than a distance between the first bent portion and the insertion portion of the first coil.

6. The stator for a rotary electric machine according to claim 4, wherein the first bent portion and the second bent portion are formed in a manner that a distance between the first bent portion and the second bent portion is larger than a distance between the insertion portion of the second coil and the second bent portion.

7. The stator for a rotary electric machine according to claim 3, further comprising a third coil, wherein the first coil includes at least the first and second bent portions at different positions in a rotation axis direction of the rotary electric machine, and is inserted into a first layer of the first slot, the second coil is inserted into the second slot, the third coil is inserted into a layer adjacent to the second coil in a radial direction of the rotary electric machine in the second slot into which the second coil is inserted, and a connection portion of the first coil is located on a same layer as an insertion portion of the third coil and is arranged outside in the rotation axis direction.

8. The stator for a rotary electric machine according to claim 3, wherein a joint portion end surface is configured in a direction substantially perpendicular to a rotation axis of the rotary electric machine, and a circumferential length of a connection portion of the first coil is longer than a circumferential length of the insertion portion of the second coil.

9. The stator for a rotary electric machine according to claim 4, wherein the first bent portion is configured to be substantially parallel to a rotation axis.

10. A rotary electric machine comprising the stator according to claim 2.

11. A wheel comprising the rotary electric machine according to claim 1.

* * * * *